United States Patent [19]

Lukich

[11] 4,022,848

[45] May 10, 1977

[54] BLADDER COMPOSITION CONTAINING LOW UNSATURATION BUTYL RUBBER

[75] Inventor: Lewis T. Lukich, Akron, Ohio

[73] Assignee: The Goodyear Tire & Rubber Company, Akron, Ohio

[22] Filed: Aug. 5, 1974

[21] Appl. No.: 494,655

[52] U.S. Cl. .................................. 260/846; 165/177
[51] Int. Cl.² .................... C08L 9/00; C08L 61/14
[58] Field of Search ........................... 260/845, 846

[56] References Cited

UNITED STATES PATENTS

| | | | |
|---|---|---|---|
| 2,972,600 | 2/1961 | Braidwood | 260/846 |
| 3,151,096 | 9/1964 | Kordzinski et al. | 260/846 |
| 3,489,697 | 1/1970 | Brice | 260/846 |
| 3,534,119 | 10/1970 | Relyea | 260/846 |
| 3,637,576 | 1/1972 | Sutherland | 260/846 |

Primary Examiner—John C. Bleutge
Attorney, Agent, or Firm—F. W. Brunner; J. A. Rozmajzl

[57] ABSTRACT

Butyl rubber possessing a low unsaturation content is compounded with a bromomethyl alkylated phenolic resin and a metal compound such as stannous chloride and the composition used to prepare bladders for the vulcanization of pneumatic vehicle tires.

4 Claims, No Drawings

BLADDER COMPOSITION CONTAINING LOW UNSATURATION BUTYL RUBBER

This invention relates to butyl rubber compositions and their use in tire curing bladders, air bags and curing tubes.

Tire curing bladders have been extremely well known in the art for many years, e.g., see U.S. Pat. No. 3,031,423. Tire curing bladders are attached to tire vulcanization presses and are inflated during the vulcanization of the tire to shape the tire during the vulcanization. They contain hot air, hot water and/or steam which participates in the transfer of heat into the tire for vulcanization purposes. Similar products such as air bags, e.g., see U.S. Pat. No. 2,701,895, and curing tubes are also known in the art. In many bladder compositions, butyl rubber is the major component.

The tire curing bladders are used repeatedly (anywhere from 10 to 600 or more tires can be vulcanized with one bladder) and are subjected to high vulcanization temperatures, for example, 240° F. to 385° F. and high pressures, for example, 100 to 400 psi, repeatedly. This severe useage will eventually result in the failure of the bladder if not removed from the mold. The major causes of failures are cracking, delamination and abraiding or wearing away. Air bags and curing tubes are also sometimes subjected to operating conditions which tend to cause cracking, delamination and abraiding. It is therefore desirable that a butyl rubber composition be found which will possess improved original and aged physical properties. It is also desirable that the composition be capable of being vulcanized at reasonable temperatures for reasonable periods of time.

It is an object of the present invention to provide a butyl rubber composition for tire curing bladders, air bags and curing tubes which will possess improved original and aged physical characteristics on vulcanization and which will vulcanize at a reasonable rate. Other objects will become apparent as the description proceeds.

The objects of the present invention are accomplished through the use of a low unsaturation butyl rubber containing a bromomethyl alkylated phenolic resin and a metal halide. It has been discovered that such a composition, in the absence of zinc oxide, will vulcanize at a reasonable rate and will, when vulcanized, possess improved aged and original physical properties. Such compositions are useful in tire curing bladders, air bags and curing tubes.

Butyl rubber is well known in the art and is described in U.S. Pat. No. 3,031,423, column 1, lines 15 to 24. The low unsaturation butyl rubber of the present invention contains 0.5 to 1.1 mole percent isoprene and 98.9 to 99.5 mole percent isobutylene and can be prepared by any of the well known prior art methods, e.g., as described in U.S. Pat. No. 2,356,128.

The bromomethyl alkylated phenolic resins are described in U.S. Pat. No. 2,972,600, the contents of which are incorporated herein by reference, and are prepared by brominating a phenolic material selected from the group consisting of 2-hydroxymethyl 4-alkyl phenols, 2,6-dihydroxymethyl 4-alkyl phenols, resitols of such hydroxymethyl 4-alkyl phenols wherein the resitol has an average of up to 4 phenol units, and a mixture of a 4-alkyl phenol with 0.5 to 2.1 moles of formaldehyde per mole of said phenol, said alkyl group containing 4 to 20 carbon atoms and the average bromine content of the brominated material being from about 1 to about 9 percent.

The metal compounds are tin and zinc halides. Metal compounds which are illustrative of those used in the practice of the present invention are stannous chloride, stannous bromide, zinc fluoride and zinc chloride. When stannous chloride is used, the hydrated form, $SnCl_2 \cdot 2H_2O$, is preferred.

The resin is used in the amount of 1.0 to 10.0 parts by weight per 100 parts by weight of butyl rubber. Preferably the level is from 4.0 to 7.0 parts by weight.

The metal compound is used at levels of from .25 to 2.0 parts by weight per 100 parts by weight of butyl rubber. When the $SnCl_2 \cdot 2H_2O$ is used, preferably the level is from 0.5 to 2.0 parts and most preferably the level is from 0.7 to 1.4 parts by weight. When the metal compound is other than hydrated stannous chloride, the preferred level is from 0.25 to 1.0 part.

When used in tire curing bladders, air bags and curing tubes, the butyl rubber compositions of the present invention should be essentially free of other rubbers.

The compositions should also be essentially free and preferably totally free of zinc oxide since it has a very adverse effect on the vulcanization and properties of the resulting vulcanizate.

A low unsaturated butyl rubber was compounded using the following basic formulation.

|  | Parts by Weight |
| --- | --- |
| Low Unsaturation butyl rubber | 100[1] |
| Stearic acid | 2 |
| Processing oil | 7 |
| HAF black | 50 |
|  | Total 159 |

[1]Butyl 035 from Exxon Chemical Company containing about 0.8 mole percent unsaturation.

The above formulation was further compounded as indicated in Examples 1 to 6 and Monsanto Rheometer measurements made at low frequency at 360° F.

| | Examples (Parts by Weight) | | | | | |
| --- | --- | --- | --- | --- | --- | --- |
| | 1 | 2 | 3 | 4 | 5 | 6 |
| Basic Formulation | 159 | 159 | 159 | 159 | 159 | 159 |
| Stannous chloride.2H$_2$O | 1.5 | 1.5 | 1.5 | 1.5 | 1.5 | 1.5 |
| Zinc oxide | 5 | — | 5 | — | 0.5 | 1 |
| Amberol ST-137[2] | 5 | 5 | — | — | — | — |
| SP-1056[3] | — | — | 5 | 5 | 5 | 5 |
| Rheometer Data | | | | | | |
| S min.[4] | 3.4 | 3.1 | 3.0 | 4.0 | 3.4 | 3.6 |
| S max.[5] | 7.5 | 9.2 | 5.8 | 15.1 | 8.2 | 5.0 |
| T$_{90}$[6] | 26 | 26 | 19 | 12.5 | 27 | 13 |

[2]A phenol-formaldehyde resin from Rohm & Haas Company.
[3]A bromomethylated alkylated phenolic resin, the average bromine content being from 6% to 9% and manufactured by Schenectady Chemical Company.
[4]Minimum torque (decineuton-meters).
[5]Maximum torque (decineuton-meters).
[6]Time (minutes) to 90% of maximum torque, i.e., time to S$_{90}$.

S min. is a measure of plasticity and flowability. A low value is normally desirable. S max. is a measure of the state of vulcanization. A high value is normally desirable. T$_{90}$ is a measure of the vulcanization time, and a low value is normally desirable.

As shown in Examples 3, 5 and 6, the addition of zinc oxide, even at levels as low as 0.5 part, adversely affects the state of vulcanization, i.e., results in low S max. values.

As shown in Examples 1 and 2, the use of a resin that is not brominated, whether with or without zinc oxide, also results in a much lower state of vulcanization. In addition the vulcanization time, $T_{90}$, is lengthened.

It should be noted that Example 2 is a composition of the type described at the bottom of page 234 of Vol. 33, No. 1 of Rubber Chemistry and Technology for January to March, 1960.

The states of vulcanization of Examples 1, 2, 3, 5 and 6 were so low that the compositions would not possess the original and aged physicals of Example 4.

Any zinc or stannous halide such as zinc chloride could be substituted for the stannous chloride in Example 4 as could any other low unsaturation butyl rubber or other bromomethyl alkylated phenolic resin as described earlier herein.

A particularly preferred embodiment of the present invention involves the use of a composition comprising 100 parts by weight of a low unsaturation butyl rubber, 1 part of stearic acid, 5 parts of processing oil, 50 parts of HAF black, 1 part of hydrated stannous chloride and 5 parts of a bromomethyl alkylated phenolic resin.

While certain representative embodiments and details have been shown for the purpose of illustrating the invention, it will be apparent to those skilled in this art that various changes and modifications may be made therein without departing from the spirit or scope of the invention.

I claim:

1. A product selected from the group consisting of tire curing bladders, air bags and curing tubes, said product being prepared from an essentially zinc oxide-free polymeric composition comprising
   A. 100 parts by weight of low unsaturation butyl rubber containing 0.5 to 1.1 mole percent of isoprene and correspondingly 98.9 to 99.5 mole percent of isobutylene,
   B. 1.0 to 10.0 parts by weight of bromomethyl alkylated phenolic resin prepared by brominating a resitol of a 2,6-dihydroxymethyl 4-alkyl phenol, wherein the said alkyl group containing 4 to 20 carbon atoms and the average bromine content of the brominated resitol being from about 1 to about 9 percent, and
   C. 0.25 to 2.0 parts by weight of a metal halide selected from the group consisting of zinc halides and stannous halides.

2. The product according to claim 1 wherein the level of the resin is from 4.0 to 7.0 parts.

3. The product according to claim 1 wherein the metal halide is selected from the group consisting of zinc chloride and hydrated stannous chloride.

4. The product according to claim 2 wherein the metal halide is hydrated stannous chloride and the level of metal halide is from 0.7 to 1.4 parts.

* * * * *